March 27, 1951   C. H. TASCHE   2,546,838
SEED PLANTER
Filed Sept. 10, 1945   2 Sheets-Sheet 2

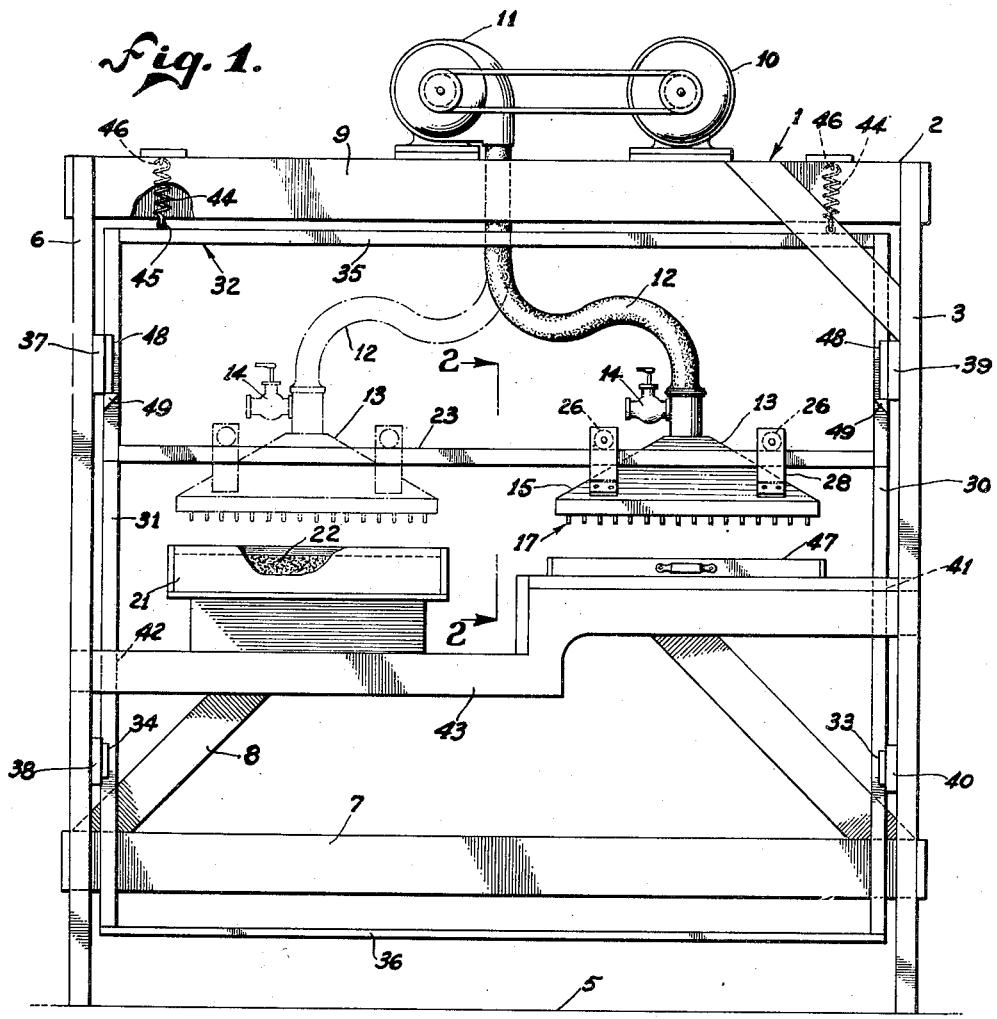

INVENTOR:
CARL H. TASCHE.
BY
W C Beatty
ATTORNEY.

Patented Mar. 27, 1951

2,546,838

UNITED STATES PATENT OFFICE 2,546,838

SEED PLANTER

Carl H. Tasche, Los Angeles, Calif.

Application September 10, 1945, Serial No. 615,461

3 Claims. (Cl. 111—1)

The invention relates to seed planting and has for an object to provide improved means for planting seed.

According to the usual nursery practice of growing flats of tomato or pepper plants or the like, the seeds are planted in a flat, being scattered by hand and planted rather thick so that transplanting to another flat is made necessary after the seedlings have grown for two or three weeks.

Where flats of plants are grown on a large scale for sale to the grower, a considerable part of the total expense is incurred in transplanting the seedlings to other flats.

An object of the present invention is to avoid the necessity of transplanting the seedlings. This is accomplished by planting the seeds in a coordinate array in the flat where the seeds remain and grow until the plants have reached market size.

The present invention has a number of advantages. Transplanting results in a set-back in the plant growth. This set-back is avoided as transplanting is not necessary. Also, more uniform plant growth is obtained. Labor is saved as it costs nine cents per flat at the present market price, to transplant 100 plants, whereas with this invention the original and only planting may be made for about five cents per flat. Contamination due to handling the plants is avoided. A larger number of plants per flat can be raised, as in the case of Anaheim chili pepper, 250 plants per flat can be raised according to the present invention, whereas only 100 plants per flat are possible when transplanting by hand. Also according to the present invention one man can plant about 200 flats per hour.

The invention provides means for simultaneously picking up from a seed bin a plurality of rows of seeds sufficient to plant the whole of a flat, with means for simultaneously depositing the rows of seeds on top of the seed bed in the flat.

Another object of the invention is to prevent disturbing the rows of seeds thus deposited, when later sprinkling the flat. This is accomplished by covering the seeds with a decomposable water-permeable septum such as tissue paper and by covering the septum with other seed bed material such as sterilized sand. As the seeds are thus protected and covered, sprinkling does not disturb their spacing. The septum decomposes in about one week and does not interfere with growth of the seedling.

For further details of the invention reference may be made to the drawings wherein Fig. 1 is a view in elevation of means for practising planting the seed according to the present invention.

Fig. 2 is a partial sectional view on line 2—2 of Fig. 1 looking in the direction of the arrows.

Figure 3:
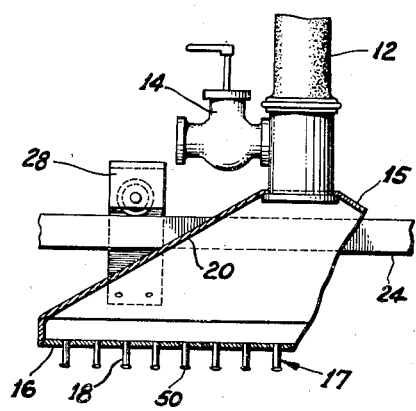
Fig. 3 is an enlarged sectional view with parts broken away on line 3—3 of Fig. 2 looking in the direction of the arrows.

Referring in detail to the drawings, the seed planter 1 comprises a stationary frame work 2 having at the right end thereof two vertical legs 3 and 4 adapted to rest on the floor or other support indicated at 5. The left end of the frame 2 similarly has two vertical legs one of which is indicated at 6 which extend to the floor or other support 5. The four legs indicated at 3, 4 and 6 are held in spaced relation by suitable cross braces indicated at 7 and 8 and by top braces indicated at 9. On the top braces such as 9 is arranged an electric motor 10 having a suitable power circuit, not shown. Motor 10 drives a suction pump 11, also shown as supported on the top braces such as 9. Suction pump 11 is connected by a flexible hose 12 to a suction seed pick-up device 13 and the suction is controlled by a valve 14.

Figure 4:
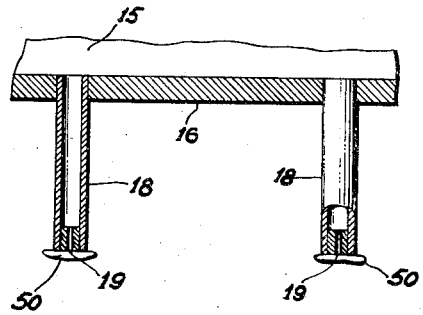
Fig. 4 is a further enlarged vertical sectional view through the seed pick-up device of the preceding figures.

The suction device 13 comprises a hollow header 15, see Fig. 3, which is in communication with valve 14 and hose 12. At the bottom of the header 15 is a horizontal plate 16 from which depend a coordinate array 17 of tubes, two of which 18 are shown in Fig. 4. Each of the tubes such as 18 opens into the header 15 and is provided at its lower end with a suction aperture 19. In the case of tomato or pepper seed, the aperture 19 may be conveniently constructed by employing a small copper tube about one-eighth inch in diameter for tube 18 by closing its lower end with solder and by drilling the hole 19 with a No. 80 drill. The diameter of tube 18 is preferably about three-quarters of the longest diameter of a seed and the size of hole 19 is approximately one-tenth to one-fifteenth the longest dimension of the seed.

The top of header 15 is preferably flared as indicated at 20 in order to give a substantially uniform suction over all of the tubes in the array 17.

Figure 5:
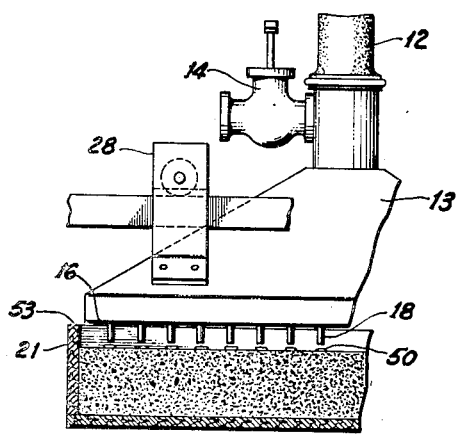
Fig. 5 is an enlarged partial view in elevation of the pick-up device in planting position.
Figure 6:
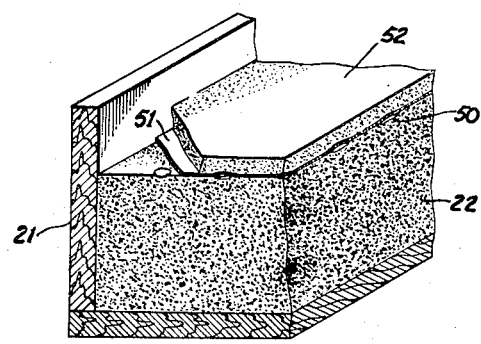
Fig. 6 is a partial sectional view in perspective of a flat planted according to the present invention.

The bottom plate 16 of the header is square and slightly smaller in size than the usual flat as indicated at 21 in Fig. 5. Also the array 17 of suction tubes are uniformly spaced in parallel rows throughout the whole area of the bottom 16 of the header and the array 17 is coordinate and covers an area corresponding to the area of the seed bed 22 in the flat 21.

The seed pick-up device 13 is slidably mounted on a horizontal track 23 which, as shown in Fig. 2, may comprise a pair of horizontal rails 24 and 25 from which the device 13 is suspended by a pair of spaced rollers 26 which ride on rail 25 and a similar pair of spaced rollers 27 which ride on rail 24. Each roller may be supported in a bracket 28 which extends outside of its track to prevent lateral movement of the suction device 13 on the track 23, as indicated in Fig. 2. Each bracket 28 arises from and is suitably secured to sloping wall 20 as indicated at 29.

The track 23 forms part of a movable frame 32 which is supported by a stationary frame 2 for movement up and down to raise or lower the pick-up device 13. The track 23 is secured at its right end to two spaced uprights 30 and the left end of track 23 is similarly secured to two spaced uprights 31, the uprights 30 and 31 each having suitable end braces indicated at 33, 34, top braces indicated at 35, and a bottom brace 36 which serves as a treadle.

The vertically movable frame 32 may be guided for vertical movement by guide blocks 37, 38, 39, 40 on frame 2 and the uprights 30 and 31 may also be guided by apertures such as 41, 42 in the work bench 43 secured to the stationary frame 2.

The movable frame 32 is held in its raised position by tension springs such as 44 connected at one end to the frame member 35 as indicated at 45 and fixed at its other end to the frame member 9 as indicated at 46. The operator may step on treadle 36 to lower the frame 32 against the tension of springs 44.

At one side of the bench 43, underneath one end of the track 23 is supported a shallow box 47 larger than the array 17 of pick-up tubes. The box 47 comprises a seed supply station or a seed bin to hold a supply of seeds to be picked up by the device 13.

At the other end of bench 43 is a planting station having flat 21 which, as above described, is slightly larger than the pick-up device 13. Flat 21 contains a bed 22 of soil or other seed bed material.

In the operation of the device, the size of tube 18 and the size of pick-up aperture 19 are properly chosen with due regard to the seeds to be handled, as above noted. The seeds are spread out to fully cover the seed bin 47 and the operator moves the pick-up 13 by hand along track 23 to bring it over the seed bin 47. The relief valve 14 is, of course, closed and the pump 11 produces suction in the pick-up 13 and in the array 17 of pick-up tubes. The operator then steps on treadle 36 to lower the array 17 of tubes into the seed bin 47, whereby each tube 18 picks up a seed as indicated at 50 in Fig. 4. The operator then releases treadle 36 whereupon the springs 44 elevate the track 23 and the pick-up 13, with its coordinate array of seeds, above the seed bin 47 as indicated in full lines in Fig. 1. Upward movement of the frame 32 may be limited by a stop 48 on frame 2 and a cooperating stop 49 on frame 32.

The operator then slides the pick-up device 13 by hand along track 23 to a position over flat 21 and steps on treadle 36 to lower the pick-up device 13 so that the lower ends of the pick-up tubes 18 and their seeds are closely adjacent the top of the seed bed 22 as indicated in Fig. 5. The operator then opens valve 14 to relieve the suction and the seeds drop on top of the seed bed 22. The operator then releases the treadle 36 to elevate the pick-up device 13, closes valve 14, and the above operation is repeated to plant other flats.

After the seeds indicated at 50 have been dropped on top of the seed bed 22, they are covered with a water-permeable decomposable septum 51 such as tissue paper and a layer 52 of sterilized sand or other seed bed material is placed on top of the septum 51. The thickness of the seed bed material is that thickness determined by the proper depth to which the seeds 50 should be planted. When water is sprinkled on the upper seed bed layer 52, the coordinate array of seeds as dropped by device 13 on top of seed bed 22 is not disturbed as they are protected by the paper 51 and sand 52.

At the time that the seeds are dropped from the tubes 18, preferably the lower end of these tubes is about one-eighth of an inch above the top of seed bed 22, to prevent the seeds from bouncing or losing their coordinate array. While suitable indicating means, not shown, may be employed to indicate the depth to which the pick-up device 13 is to be lowered with regard to the flat 21, it has been found that satisfactory results are obtained as follows. All standard flats have a side wall 3 inches in height. In filling the flats with the lower seed bed 22, a leveling device is employed to level off the top of seed bed 22 to obtain a depth of that seed bed of two and one-half inches. The suction tubes 18 may extend about one-half inch below the bottom plate 16 and hence the operator may determine when the pick-up 13 is lowered the desired amount, by observing the distance between the top 53 of the side wall of the flat 21, see Fig. 5, in relation to the level of the bottom plate 16 of the device 13.

The pick-up device 13 should not be lowered enough to push the tubes 18 into the soil for the reason that suction in the tubes 18 would pick up dirt and clog up the suction apertures 19.

As above described, each tube 18 picks up only one seed. While this is generally true, it has been found that occasionally a tube 18 will pick up two seeds, particularly if two seeds are stuck together. However this happens only occasionally and not often enough to detract from the many advantages above noted.

I claim:

1. A seed planter comprising a horizontal track, a suction header slidable on said track, means supporting said track for vertical movement, means under control of the operator for raising and lowering said tracks, means for supporting a seed bin and a flat side by side under said track, said suction header having a horizontal coordinate array of suction tubes embracing an area substantially the same as the area of said flat, each of said tubes having a suction aperture smaller than the seed, means for producing a suction in said header and means for controlling the suction in said header.

2. A seed planter according to claim 1 comprising spring means for raising said track and a stop for limiting the upward movement of said track, said means under control of the operator comprising a treadle.

3. A seed planter according to claim 1 wherein said suction producing means comprises a suction pump stationary with respect to said track and a flexible pipe connecting said pump to said header.

CARL H. TASCHE.

REFERENCES CITED

The following references are of record in the file of this patent:

UNITED STATES PATENTS

| Number | Name | Date |
|---|---|---|
| 423,645 | Walter | Mar. 18, 1890 |
| 554,999 | Fowler | Feb. 18, 1896 |
| 736,252 | Hering | Aug. 11, 1903 |
| 792,958 | Bagger | June 20, 1905 |
| 1,904,720 | Douglass | Apr. 18, 1933 |
| 2,253,283 | Minaker | Aug. 19, 1941 |
| 2,390,242 | Engler | Dec. 4, 1945 |
| 2,455,701 | Putnam et al. | Dec. 7, 1948 |

FOREIGN PATENTS

| Number | Country | Date |
|---|---|---|
| 250,229 | Great Britain | Nov. 4, 1926 |
| 310,568 | Italy | Aug. 24, 1932 |
| 750,969 | France | June 12, 1933 |